(12) United States Patent
Loew (10) Patent No.: US 7,565,031 B2
(45) Date of Patent: Jul. 21, 2009

(54) METHOD AND CIRCUIT FOR SCALING RASTER IMAGES

(75) Inventor: Andreas Loew, Gross-Gerau (DE)

(73) Assignee: Thomson Licensing, Boulogne Billancourt (FR)

( * ) Notice: Subject to any disclaimer, the term of this patent is extended or adjusted under 35 U.S.C. 154(b) by 618 days.

(21) Appl. No.: 10/806,734

(22) Filed: Mar. 23, 2004

(65) Prior Publication Data

US 2004/0218835 A1 Nov. 4, 2004

(30) Foreign Application Priority Data

Apr. 3, 2003 (DE) .............................. 103 15 442

(51) Int. Cl.
*G06K 9/32* (2006.01)
(52) U.S. Cl. .................. 382/298; 345/660; 348/581; 348/704; 358/451; 708/208
(58) Field of Classification Search .................. 382/298
See application file for complete search history.

(56) References Cited

U.S. PATENT DOCUMENTS 5,097,518 A * 3/1992 Scott et al. .................. 382/298
5,530,482 A * 6/1996 Gove et al. .................. 348/441
5,561,725 A 10/1996 Degi et al.
5,825,367 A 10/1998 Shyu et al.
2002/0114535 A1 * 8/2002 Luo ........................... 382/282
2003/0185451 A1 * 10/2003 Jung .......................... 382/233

FOREIGN PATENT DOCUMENTS

EP 0497494 8/1992

* cited by examiner

*Primary Examiner*—Matthew C Bella
*Assistant Examiner*—David P Rashid
(74) *Attorney, Agent, or Firm*—Robert D. Shedd; Robert B. Levy (57) ABSTRACT

A method is proposed which enables high-resolution raster images to be represented on lower-resolution displays. The method according to the invention selects support points in lines and columns of the original image, which have a smallest possible variation of their distances and approximate the set scaling at least in ranges. Consequently, rational scaling ratios can also be achieved in an advantageous manner. In order to represent fine details of the original image in the scaled image as well, the adjacent pixels of the support points are also incorporated into the calculation of the pixels that are output. Furthermore, a circuit for scaling a raster image in real time is proposed. Moreover, a film scanner having a scaling device in accordance with the method according to the invention is proposed.

5 Claims, 6 Drawing Sheets

METHOD AND CIRCUIT FOR SCALING RASTER IMAGES

This application claims the benefit under 35 U.S.C. § 119 of German application number 10315442.6, filed Apr. 3, 2003.

FIELD OF THE INVENTION

The invention relates to the field of representing high-resolution raster images on lower-resolution screens. In particular, the invention relates to a control monitor in a film scanner, the control monitor having a coarser resolution than the fine resolution of the film scanner which generates raster images having a high resolution. The term raster image is used hereinafter as a synonym for digital image. It describes an image which is composed of a multiplicity of discrete pixels and whose pixels are arranged in lines and columns. A raster image may be present as a black-and-white image or as a color image, and the information describing the pixel may be of arbitrary configuration, e.g. color triad for the primary colors red, green and blue (RGB) or the like. The components forming a pixel, e.g. the color triads, are also referred to as subpixels. The term resolution denotes the number of pixels which represent a region of the image. In this case, a finer or higher resolution means that more pixels are present for the same region of an image than in the case of a coarser or lower resolution.

BACKGROUND OF THE INVENTION

For digital further processing or distribution of films which have been recorded by conventional film cameras, the developed films are digitized. In this case, the film is for example moved continuously past a sensor which scans the film line by line. In this case, a scanned line comprises a multiplicity of successive pixels or pixels lying next to one another. Successively scanned lines in each case produce an image. It is also possible to scan the images of a film by means of an area-array sensor. In this case, the pixels of all the lines and columns which digitally represent the image are scanned simultaneously by a sensor.

It is usually possible for different film formats to be scanned in film scanners. Customary film formats are e.g. 16 mm, 35 mm and 70 mm films. Modern film scanners can nowadays scan the images of the films with 4000 or more pixels per line. Consequently, a scanned image of a conventional film in an aspect ratio of 16:9 results, for example, in digitized images which comprise 4000 pixels in one line and 2250 lines per image. The scanning quality is usually controlled by an operator during scanning. Owing to the high resolution required for the control monitor, computer screens are usually used. Computer screens are optimized for image reproduction with a specific number of lines and pixels per line. The resulting resolutions of the screen are, for example, 800×600, 1280×1024 or 1600×1200 pixels for monitors in a 4:3 aspect ratio. Analog tube monitors, in the case where an analog video signal is fed in, can theoretically also represent resolutions between these values, but the maximum resolution is limited in this case, too, e.g. by the slotted mask or shadowmask used. The resolution of LCD screens, the use of which has become more and more prevalent recently, is defined on fundamental grounds. Consequently, with both types of monitors, it is not possible to satisfactorily represent images with a considerably higher resolution than the resolution of the monitor. If an image having a higher resolution is intended to be represented on a screen having a lower resolution, pixels must be obviated in the horizontal and vertical image directions. However, omitting pixels means that the size of the image to be represented is reduced, under certain circumstances, such that said image does not cover the entire available screen region in terms of width and/or height. Thus, by way of example, an image having a resolution of 1000 pixels per line and 560 lines per image would be enabled to be represented on a screen having a resolution of 800×600 pixels by every second pixel being obviated in the horizontal and vertical directions. Although the resulting image having 500× 280 pixels would now be able to be represented on the screen, it would not utilize the usable size of the screen. Although it would be possible to scale only the horizontal resolution, i.e. to omit pixels only in the lines, the image would thereby be distorted undesirably. Moreover, omitting individual pixels means that individual fine details of the image cannot be represented on the monitor and thus cannot be controlled by the user either. This relates in particular to thin lines lying parallel to the scanning raster of the film scanner. Therefore it is desirable to employ a method which enables digitized images having a higher resolution to be displayed without distortion with the largest possible representation size on a screen having a lower resolution and nevertheless as many image details as possible to be made visible. Furthermore, it is desirable to use a circuit which carries out the scaling in real time.

SUMMARY OF THE INVENTION

The method proposed solves the problem of free scaling of raster images also for the cases in which the number of pixels per line and the number of lines per image of input image and output image do not form an integral multiple, that is to say for rational scaling factors. The scaling circuit proposes a hardware arrangement which enables raster images to be scaled freely in real time. Advantageous refinements and developments of the invention are specified in the subclaims.

The method according to the invention selects pixels in the lines and columns of the input image which represent the pixels in the lines and columns of the output image reproduced on a control monitor. In this case, the selected pixels are distributed with integer pixel distances in such a way that the distances between individual selected pixels, given rational scaling factors, deviate from one another as little as possible. In this case, a rational scaling ratio of input image to output image is achieved at least over a respective region of a line and/or column of the raster image. The selected pixels are also referred to as support points. The pixels between two selected pixels or support points can be used to form values which describe a pixel and which are used instead of the selected pixel for reproduction in the output image. As an alternative thereto it is also possible to use the minimum value or the maximum value of the pixels lying between two selected pixels or support points for reproduction in the output image. Furthermore, it is possible to subject the pixels between two selected pixels to a suitable filter function, and to obtain from this a value for the output image pixel to be represented. For calculating one pixel of the output image, it is also possible to use pixels on both sides of a selected pixel or a support point. It is also possible to use pixels at a greater distance from the support point than that to the nearest adjacent support point for calculating the pixel to be represented.

A preferred development of the invention enables scaling in the horizontal and vertical directions with individual scaling factors.

The pixels referred to in the invention may be composed of individual pixels for the three primary colors red, green and blue, so-called subpixels, or merely comprise brightness values, or merely comprise brightness values in the case of black-and-white images. Furthermore, any desired combination of color and brightness values for determining a pixel is also conceivable. The invention may optionally be applied to the individual subpixels, or to a total value which is generated therefrom and represents the pixel. In the case of an input image which is present in subpixels, the subpixels associated with a primary color may also be processed in an offset manner, i.e. the pixels at the support points of the output image are calculated from input values which are offset by one or a plurality of pixels or subpixels. As a result, it is possible to achieve a certain filter effect which allows the image to appear more uniform. Furthermore, it is conceivable to generate two successive lines or columns of the output image with pixels which have been calculated from offset pixels of the corresponding lines or columns of the input image. As a result, fine details are detected and reproduced even more reliably. For this purpose, the calculation operation for the support points may be started with a suitable offset in a simple manner.

A preferred embodiment of the method according to the invention has the particularly advantageous effect that the image content is not impaired in the case of unmodified pixels which may result depending on the scaling performed.

The method according to the invention and also the circuits according to the invention can be advantageously used in film scanners. In particular, the scaling circuits are suitable for scaling the control image in real time, i.e. an image is scaled at the instant of representation on a screen or control monitor and need not be buffer-stored. Given sufficient processor power, however, scaling in real time is also possible in program-controlled fashion.

BRIEF DESCRIPTION OF THE DRAWINGS

The invention will be described in detail below with reference to the drawing, in which.

Identical or similar parts are provided with the same reference symbols in the figures.

Figure 1:
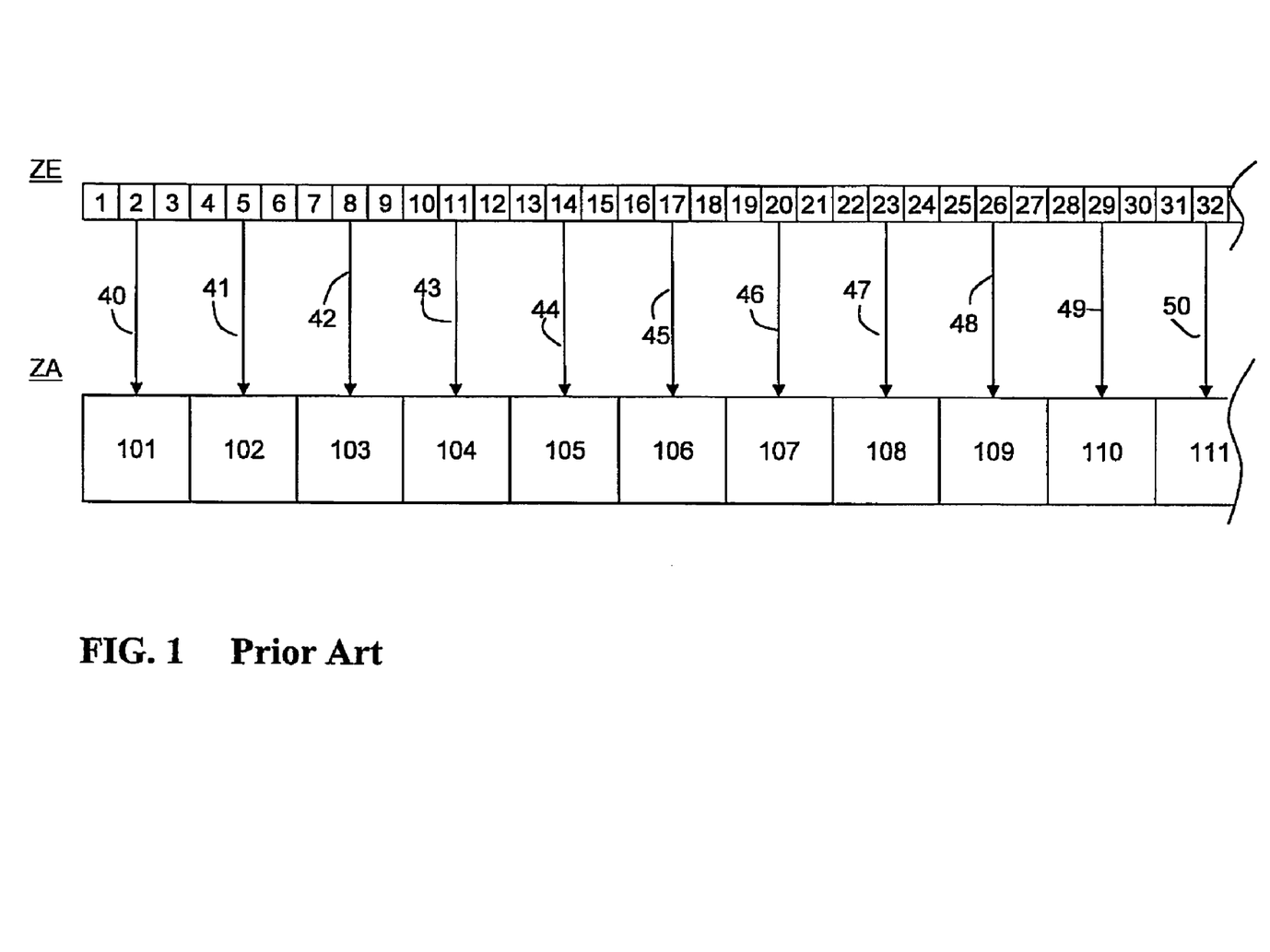
FIG. 1 shows a diagrammatic representation of part of an input and an output image line scaled according to the prior art.

FIG. 1, which describes the prior art, represents part of a line ZE of an input image having a high resolution. The represented part of the line ZE is formed by pixels 1 to 32. The high resolution is represented by the small size of the rectangles representing the pixels. The line ZE is intended to be imaged onto a low-resolution output line ZA. The line ZA is partly represented by pixels 101 to 111 in the figure. The low resolution is represented by the comparatively large size of the rectangles representing the pixels. Arrows 40 to 50 are represented between the input line ZE and the output line ZA and illustrate the allocation of pixels of the input line ZE to pixels of the output line ZA. In FIG. 1, every third pixel of the input line ZE is assigned to a pixel in output line ZA. Image information contained in unassigned pixels is not represented and is lost.

DETAILED DESCRIPTION OF PREFERRED EMBODIMENTS

Figure 2:
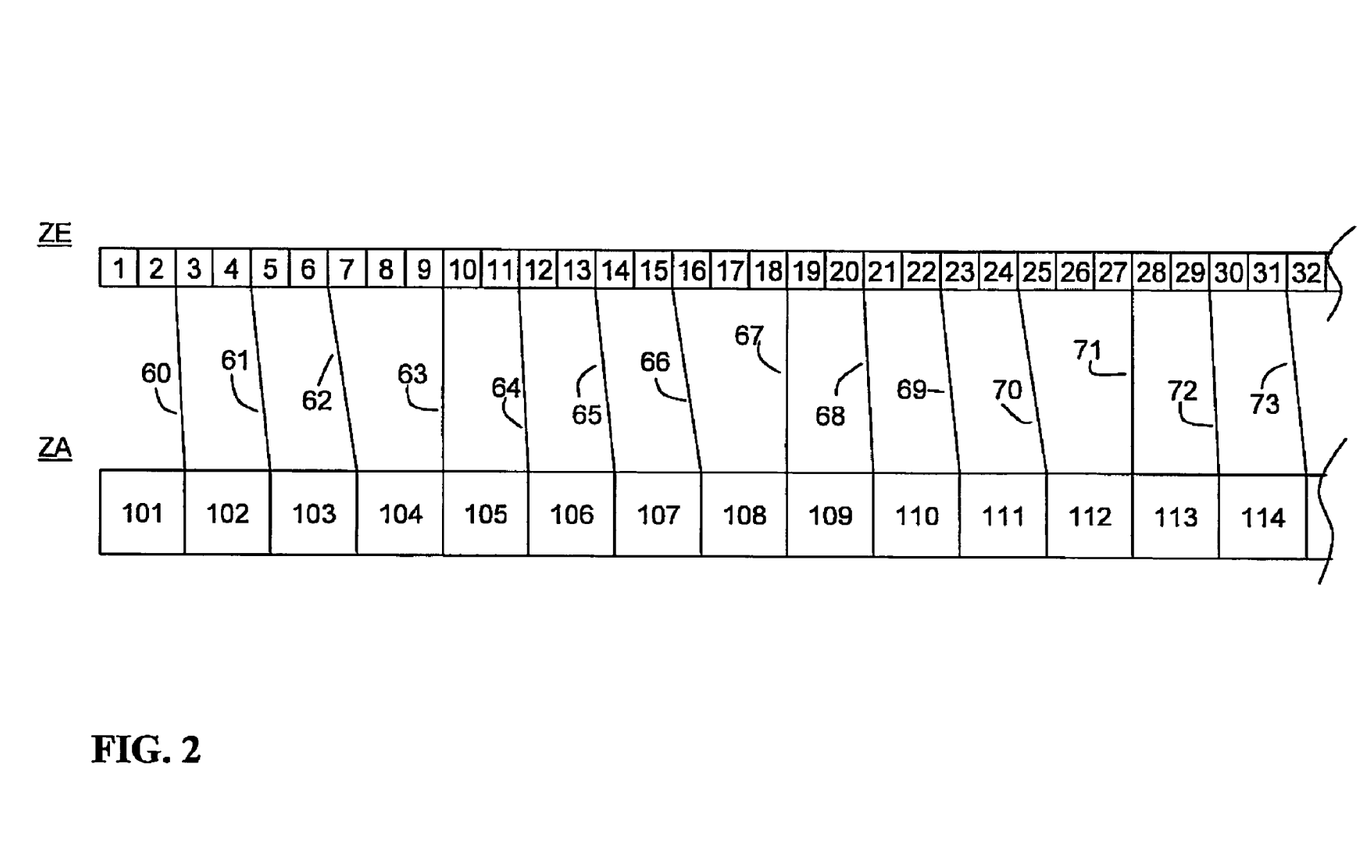
FIG. 2 shows a diagrammatic representation of part of an input and an output image line scaled according to the method according to the invention.

FIG. 2, which describes the principle of the invention, represents part of a line ZE of an input image having a high resolution, as previously in FIG. 1. The represented part of the line ZE is formed by pixels 1 to 32. The line ZE is intended to be imaged onto a low-resolution output line ZA. The line ZA is partly represented by pixels 101 to 114 as previously in FIG. 1. Lines 60 to 73 are arranged between the input line ZE and the output line ZA and indicate the boundaries between combined pixels, that is to say the support points. The support points are arranged between the pixels because all the pixels between the support points are used for calculating a pixel.

Figure 3:
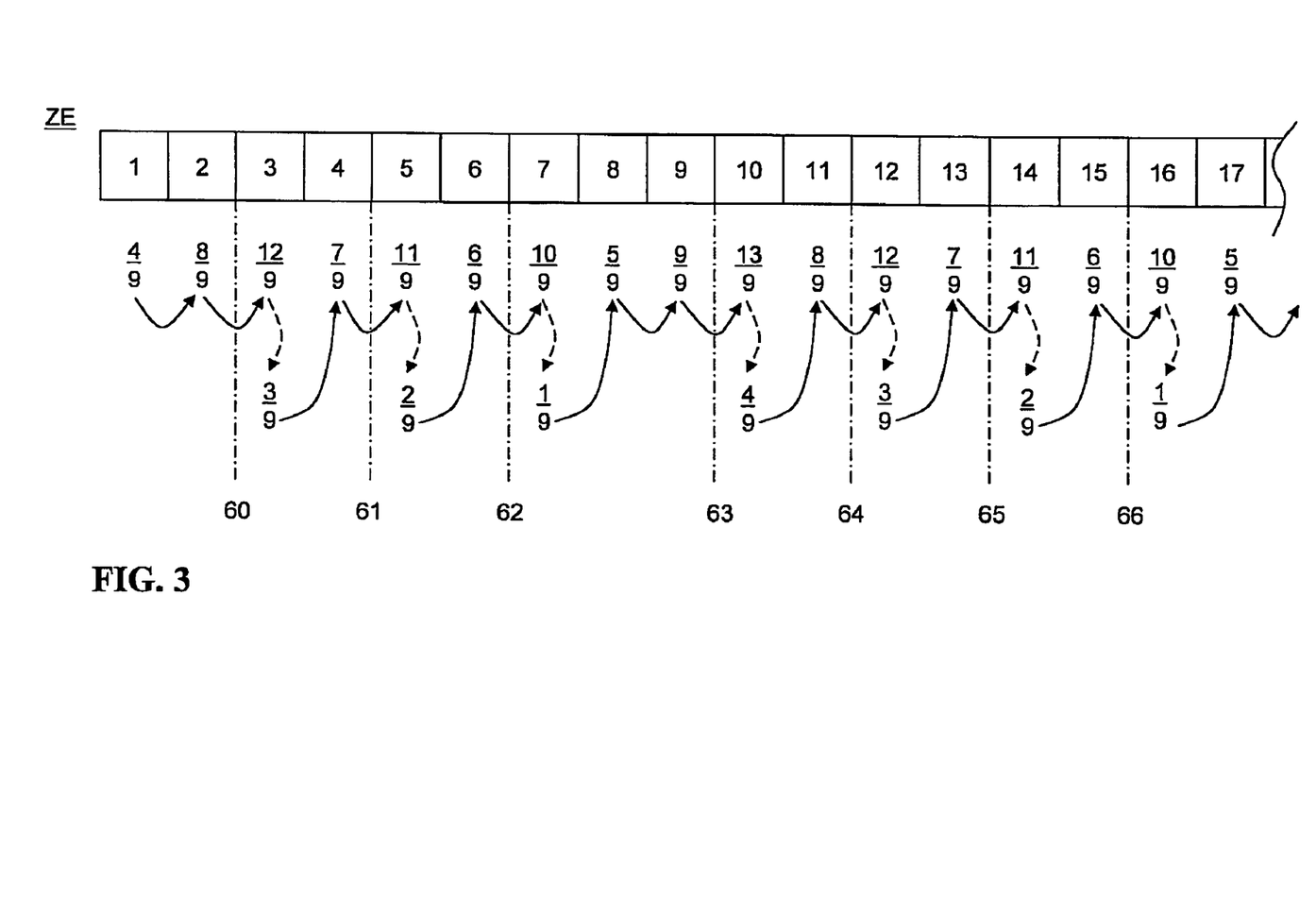
FIG. 3 shows a diagrammatic representation of the determination of the support points in the input image which form the output image.

The calculation of how many input pixels are combined to form an output pixel will be explained by way of example with reference to FIG. 3. In this case, an input image having 2250 pixels per line is intended to be represented on a screen having 1000 pixels per line. The ratio of the pixels per line of 2250 to 1000 results in the requirement of in each case combining 2.25 pixels to form a pixel. However, fractions of pixels cannot be evaluated in a digital raster image. The obvious solution of using in each case the third pixel for reproduction, as is represented in FIG. 1, would lead to a representation of the image with 750 pixels. Consequently, only ¾ of the available line resolution of the monitor of 1000 pixels would be utilized. According to the method according to the invention, support points are calculated from the input image in such a way that the distances between the individual support points deviate minimally from one another, the support points are distributed uniformly over the input image and the entire available line resolution of the monitor is utilized. For this purpose, the required scaling factor, 2.25 in the example, is converted into an addend for addition per pixel of the input image. This conversion represents a simple inversion. For better understanding in this example, the value may be represented as a fraction having the magnitude 4/9. The support points are determined by beginning, at the first pixel of a line, to add up the addend for each further pixel. A support point is determined when the sum of the added-up addends is greater than 1. In the example in FIG. 3, the first pixel 1 receives the value 4/9, the second pixel 2 the value 8/9 and the third pixel 3 the value 12/9. In the figure, mathematical operations, that is to say addition and subtraction, are represented by arrows between the values, an addition being represented by an arrow with a solid line and a subtraction being represented by an arrow with a broken line. In the addition step from the second pixel 2 to the third pixel 3, the added-up sum is greater than 1. A support point is situated at this point. Support points are represented by the dash-dotted lines 60 to 66 in FIG. 3. The first pixel 1 and the second pixel 2 before the support point 60 are now combined to form the output pixel 101 from FIG. 2. As previously described above, this may be effected by averaging, minimum or maximum formation, or by another suitable filter function. The third pixel 3, which received the value 12/9, must now receive a value of less than 1 because the exceeding of the value 1 in each case indicates a support point. For this purpose, the value 1 or 9/9 is subtracted from the value of the third pixel 3. The third pixel 3 thus receives the new value 3/9. The above sequence of additions and subtractions is carried out for all the pixels of a line. A support point is marked wherever the value of a pixel is greater than 1, and the value of the pixel at which the support point has been marked is reduced to a value of less than 1 by subtracting the value 1. Distances between the first three support points of two pixels then result in the example. The next support point has a distance of three pixels. This sequence of 2-2-2-3 pixels distance between the support points is repeated over the entire line. Consequently, a rational scaling ratio results range by range for the line.

The above-described method can also be applied analogously to the vertical direction, that is to say to the successive lines. In this case, it is also possible to perform different scalings for the horizontal and vertical directions. Depending on the desired scaling ratio, other addends for addition may result, and thus other sequences as well, but the method always proceeds identically in principle.

The method described with reference to FIG. 3 may be executed as a program in a microprocessor having a program memory and main memory, but it can also be realized particularly advantageously using binary circuitry.

In this case, an adder is provided, which can be incremented by predeterminable values. The maximum value of the adder is $2^n-1$, where n denotes the number of binary positions of the adder. The increment value, that is to say the addend, receives the magnitude $2^{n-1} \times SF$, with SF as scaling factor. The addition is carried out for each pixel of the input image. The most significant bit MSB of the adder is differentiated, so that it is possible to identify a state change of the most significant bit MSB. An identified state change of the most significant bit MSB of the adder marks a support point of the input image. The addition is performed further, and another state change of the most significant bit MSB of the adder marks a further support point. The overflow of the adder is disregarded in this case. The input pixels between two support points may then be combined to form an output pixel, as described further above.

In one exemplary embodiment, scaling factors are fed to horizontal and vertical adders. The differentiation of the most significant bit MSB of the adder and thus the generation of a signal for the outputting of a support point are effected by means of an exclusive-OR logic combination of the MSB with an MSB delayed by one clock cycle. This signal controls a counting and sampling stage, and furthermore the forwarding of the scaled output image data into a FIFO shift register (acronym denotes: First In, First Out) for further processing. The counter and sampling stage calculates the distance between two successive support points. The calculated distance serves as control variable for the calculation of the pixel that is output. By way of example, a filter multiplexer can be driven, which is used to select the average value or the maximum value of the pixels between the preceding and the new support point for outputting.

Figure 4:
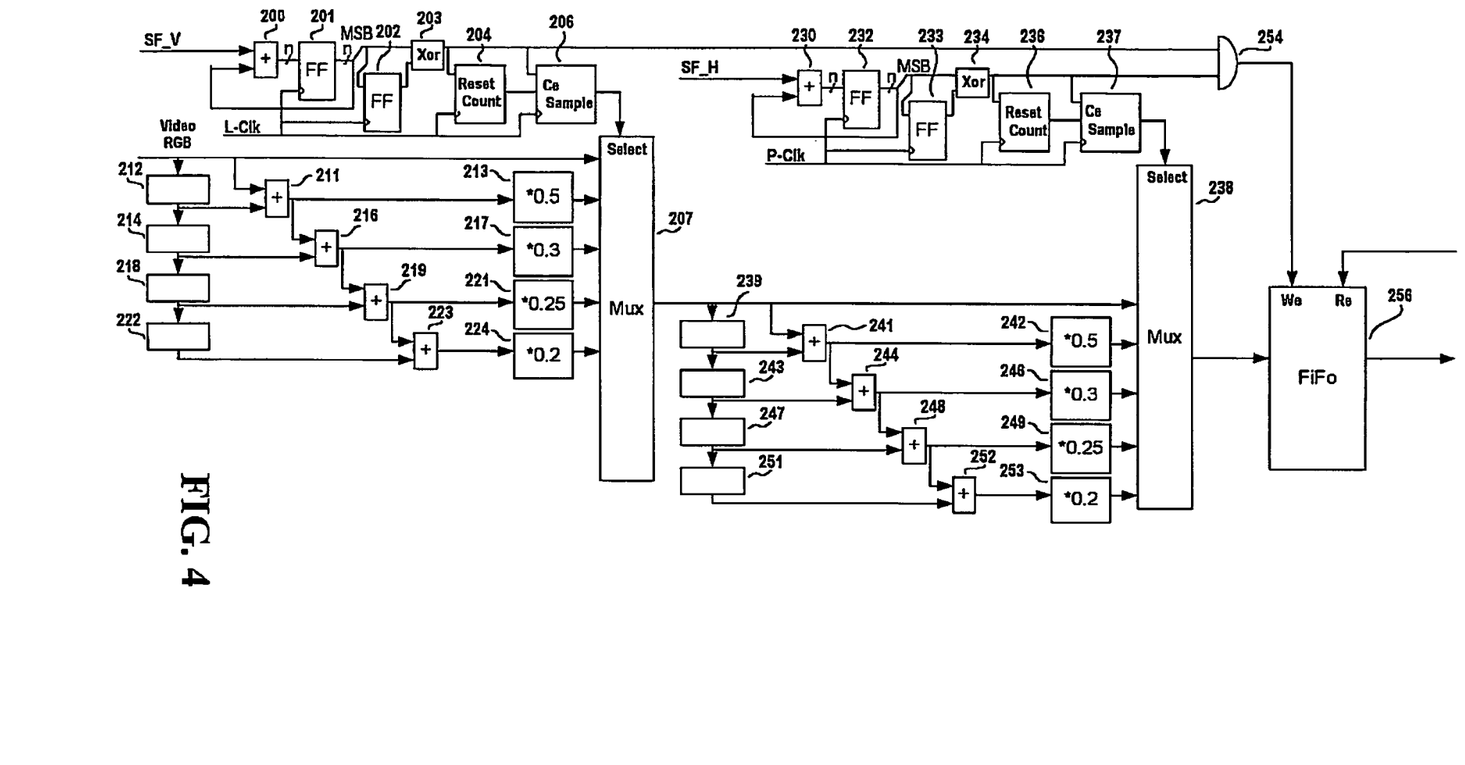
FIG. 4 shows a first circuit in binary logic for executing the scaling method according to the invention.

FIG. 4 represents a first practical embodiment of a scaler created using binary circuitry. A scaling factor SF_V for the vertical image scaling is applied to an input of an adder 200 having the bit width n. The content of the adder passes for buffer-storage to a number of flip-flops 201 corresponding to the bit width of the adder. The outputs of the flip-flops 201 are fed back to the adder. The output of that flip-flop from the number of flip-flops 201 which contains the most significant bit MSB of the adder is additionally connected to a flip-flop 202 and an exclusive-OR gate 203. This makes it possible to differentiate the most significant bits of the adder of two successive additions, i.e. to ascertain a state change at the position of the most significant bit MSB. An output of the exclusive-OR gate 203 is connected to the reset input of a counter 204 and to the enable input of a sampling stage 206. The flip-flops 201 and 202 and also the counter 204 and the sampling stage 206 are furthermore connected to a line clock line L-Clk. The output of the sampling stage 206 drives a multiplexer 207. A signal video-RGB is applied directly to the multiplexer 207. The signal video-RGB is furthermore applied to a first adder 211 directly and via a first delay circuit 212. The output of the first adder 211 is connected to the multiplexer via a first multiplier circuit 213. In FIG. 4, the first multiplier circuit 213 has a fixed multiplication factor of 0.5. The signal video-RGB conducted via the first delay circuit 212 is additionally applied to a second delay circuit 214. From the output of the second delay circuit 214, the signal passes to a second adder 216, to which the output signal of the first adder 211 is additionally applied. The output signal of the second adder 216 passes to the multiplexer 207 via a second multiplier circuit 217. In FIG. 4, the second multiplier circuit 217 has a fixed multiplication factor of 0.3. The signal video-RGB conducted via the first delay circuit 212 and the second delay circuit 214 furthermore passes to a fourth delay circuit 222 via a third delay circuit 218. The output signal of the third delay circuit 218 is combined with the output signal of the second adder 216 in a third adder 219. The output signal of the third adder 219 passes to the multiplexer 207 via a third multiplier circuit 221. In FIG. 4, the third multiplier circuit 221 has a fixed multiplication factor of 0.25. The output signal of the fourth delay circuit 222 is combined with the output signal of the third adder 219 in a fourth adder 223. The output signal of the fourth adder 223 passes to the multiplexer 207 via a multiplication circuit 224. In FIG. 4, the third multiplier circuit 221 has a fixed multiplication factor of 0.2.

A scaling factor SF_H for horizontal image scaling is applied to an input of an adder 231 having the bit width n. As described above for vertical scaling, the content of the adder passes for buffer-storage to a number of flip-flops 232 corresponding to the bit width of the adder. The outputs of the flip-flops 232 are fed back to the adder. The output of that flip-flop from the number of flip-flops 232 which contains the most significant bit MSB of the adder is additionally connected to a flip-flop 233 and an exclusive-OR gate 234. This makes it possible to differentiate the most significant bits of the adder of two successive additions, i.e. to ascertain a state change at the position of the most significant bit MSB. An output of the exclusive-OR gate 234 is connected to the reset input of a counter 236 and to the enable input of a sampling stage 237. The flip-flops 232 and 233 and also the counter 236 and the sampling stage 237 are furthermore connected to a pixel clock line P-Clk. The output of the sampling stage 237 drives a multiplexer 238. The output signal of the multiplexer 207 is applied to the multiplexer 238. The output signal of the multiplexer 207 is additionally conducted via a chain of delay circuits 239, 243, 247 and 251, in the same way as the above-described signal video-RGB. From the outputs of the delay circuits 239, 243, 247 and 251, the output signals pass, in the manner described above, to the multiplexer 238 via adders 240, 244, 248 and 252 and also multiplier circuits 242, 246, 249 and 253. The multiplier circuits 242, 246, 249 and 253 in FIG. 4 have the fixed multiplication factors 0.5, 0.3, 0.25 and 0.2, respectively.

The outputs of the exclusive-OR gates 203 and 234 are furthermore connected to an AND gate 254. The output of the AND gate 254 controls the write accesses to a FIFO shift register 256. The FIFO shift register 256 buffer-stores the data arriving from the multiplexer 238 for the purpose of further processing.

Figure 5:
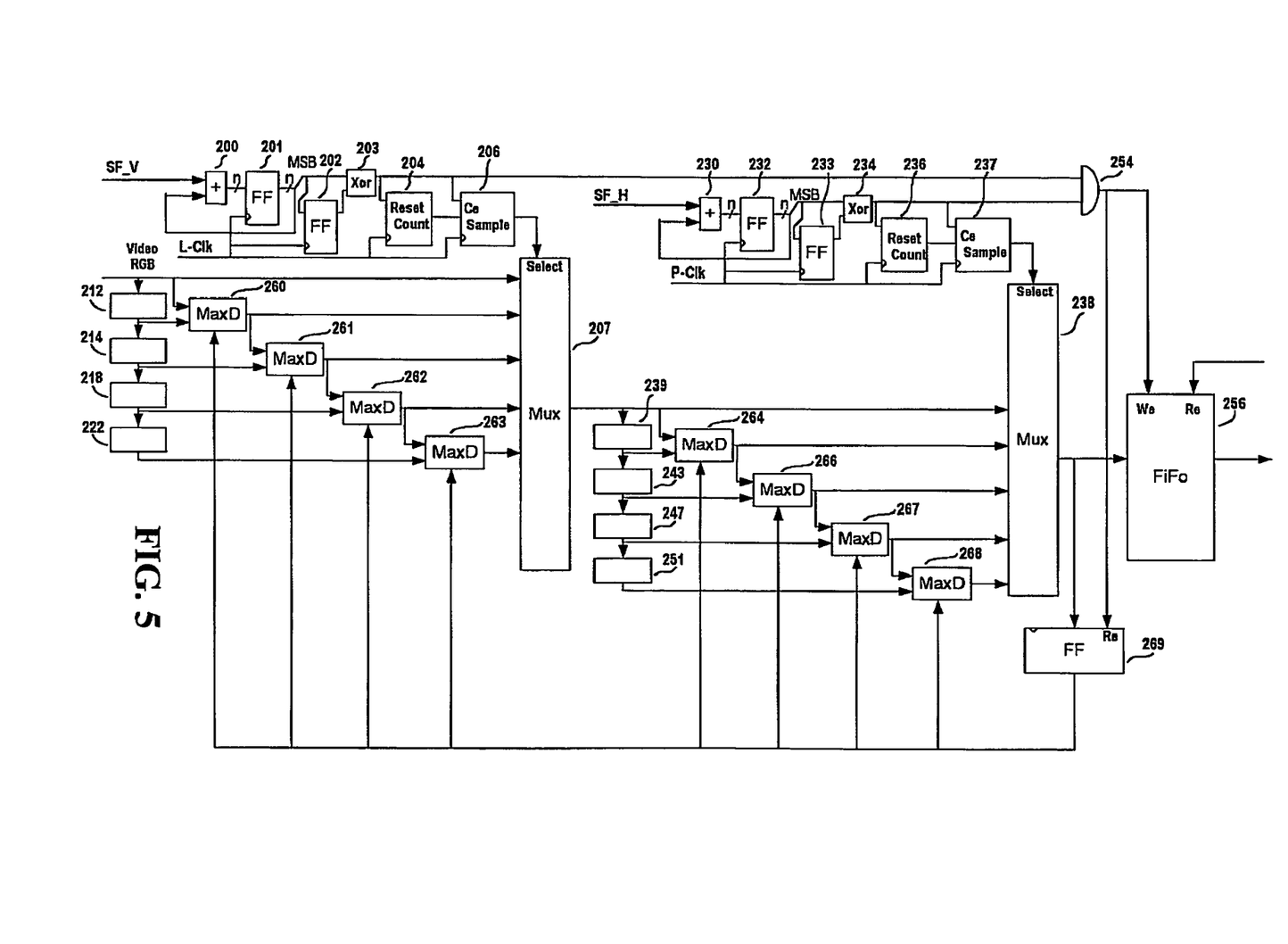
FIG. 5 shows a second circuit in binary logic for executing the scaling method according to the invention.

FIG. 5 represents a second practical embodiment of a scaler created using binary circuit technology. As in FIG. 4, a scaling factor SF_V for vertical image scaling is applied to an input of an adder 200 having the bit width n. The content of the adder passes for buffer-storage to a number of flip-flops 201 corresponding to the bit width of the adder. The outputs of the flip-flops 201 are fed back to the adder. The output of that flip-flop from the number of flip-flops 201 which contains the most significant bit MSB of the adder is additionally connected to a flip-flop 202 and an exclusive-OR gate 203. This makes it possible to differentiate the most significant bits of the adder of two successive additions, i.e. to ascertain a state change at the position of the most significant bit MSB. An output of the exclusive-OR gate 203 is connected to the reset input of a counter 204 and to the enable input of a sampling stage 206. The flip-flops 201 and 202 and also the counter 204 and the sampling stage 206 are furthermore connected to a line clock line L-Clk. The output of the sampling stage 206 drives a multiplexer 207. A signal video-RGB is directly applied to the multiplexer 207. The signal video-RGB is furthermore applied to a first comparator 260 directly and via a first delay circuit 212, which comparator in each case selects the larger of the two input signals. The output of the first comparator 260 is connected to the multiplexer. The signal video-RGB conducted via the first delay circuit 212 is additionally applied to a second delay circuit 214. From the output of the second delay circuit 214, the signal passes to a second comparator 261, to which the output signal of the first comparator 260 is additionally applied. The output signal of the second comparator 261 is applied to the multiplexer 207. The signal video-RGB conducted via the first delay circuit 212 and the second delay circuit 214 furthermore passes to a fourth delay circuit 222, via a third delay circuit 218. The output signal of the third delay circuit 218 is compared with the output signal of the second comparator 261 in a third comparator 262. The output signal of the third comparator 262 is likewise applied to the multiplexer 207. The output signal of the fourth delay circuit 222 is compared with the output signal of the third comparator 262 in a fourth comparator 263. The output signal of the fourth comparator 263 is fed to the multiplexer 207.

As in the circuit described in FIG. 4, a scaling factor SF_H for horizontal image scaling is applied to an input of an adder 231 having the bit width n. As described above for vertical scaling, the content of the adder passes for buffer-storage to a number of flip-flops 232 corresponding to the bit width of the adder. The outputs of the flip-flops 232 are fed back to the adder. The output of that flip-flop from the number of flip-flops 232 which contains the most significant bit MSB of the adder is additionally connected to a flip-flop 233 and an exclusive-OR gate 234. This makes it possible to differentiate the most significant bits of the adder of two successive additions, i.e. to ascertain a state change at the position of the most significant bit MSB. An output of the exclusive-OR gate 234 is connected to the reset input of a counter 236 and to the enable input of a sampling stage 237. The flip-flops 232 and 233 and also the counter 236 and the sampling stage 237 are furthermore connected to a pixel clock line P-Clk. The output of the sampling stage 237 drives a multiplexer 238. The output signal of the multiplexer 207 is applied to the multiplexer 238. The output signal of the multiplexer 207 is additionally conducted via a chain of delay circuits 239, 243, 247 and 251 in the same way as the signal video-RGB described above. From the outputs of the delay circuits 239, 243, 247 and 251, the output signals pass to the multiplexer 238 via comparators 264, 266, 267 and 268 in the manner described above.

The outputs of the exclusive-OR gates 203 and 234 are furthermore connected to an AND gate 254. The output of the AND gate 254 controls the write accesses to a FIFO shift register 256. The FIFO shift register 256 buffer-stores the data arriving from the multiplexer 238 for the purpose of further processing. The output signal of the AND gate 254 and also the output signal of the multiplexer 238 are fed to a flip-flop 269, the output signal of which is fed to the comparators 260 to 264 and 266 to 268.

The number of delay circuits and comparators or adders and multipliers described in FIGS. 4 and 5 may also be greater or less than is specified in the figures. The number depends on the expected maximum distance between two successive support points. However, the circuit can be extended in a simple manner by corresponding duplication at the relevant points.

Figure 6:
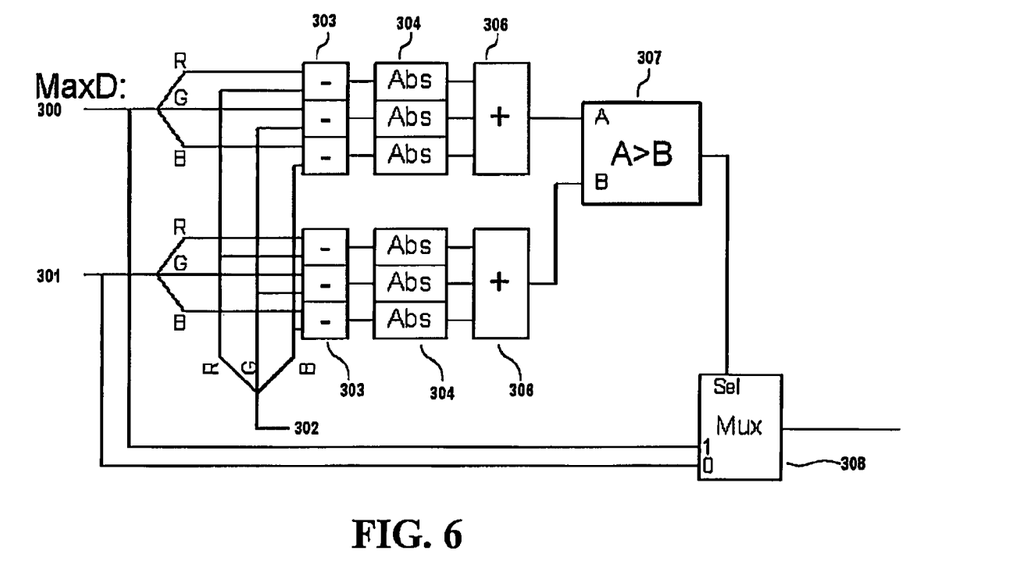
FIG. 6 shows a detailed circuit of an element from FIG. 5.

The circuit of the comparators 260 to 264 and 266 to 268 is illustrated in detail in FIG. 6. First and second video signals having the values for the primary colors red, green and blue are fed to the circuit via inputs 300 and 301. Comparison values for the primary colors are fed to the circuit via an input 302. Subtractors 303 form the difference between the comparison values and the values of the first and second video signals, respectively. The absolute value of the differences is formed in the stages 304. The adders 306 form the sum of the absolute values from the stages 304 for the first and second video signals. The sums from the adders 306 are fed to a comparator 307, the output of which drives a multiplexer 308. The multiplexer 380 selects the first or the second video signal in a manner dependent on the output signal of the comparator 307 and forms the output of the comparator circuit.

What is claimed is:

1. A method for controlling a display device to display input video images represented by a first number of pixels or subpixels arranged line by line and column by column in an input video signal to the display device which has a display area that displays an output video image having a second number of pixels or subpixels arranged line by line and column by column, wherein the numbers of lines and/or columns of the display area differ from the number of lines and/or columns of the input video images, the method comprising the steps of:

distributing a number of support points, corresponding to a number of pixels or subpixels in the output video image displayed in the display area of the display device, across the lines or columns of the input video image at integer pixel or subpixel distances having a minimum variation from one another, wherein the ratio of the number of support points to the number of pixels or subpixels in a line or column of the input video image correspond to the desired scaling factor; and selecting or calculating one of a pixel or subpixel value for a pixel or subpixel in the output video image from pixel or subpixel values in the input image lying in a range between a corresponding support point and a neighbouring support point;

wherein the method further comprises:

distributing the support points of two successive lines or columns of the input video image such that at least one range lying between two support points of one line or column of the input image spatially overlaps offset with respect to a corresponding range of a preceding or succeeding line or column of the input video image; and controlling the display device to reproduce in the display area the selected or calculated pixel or subpixel value, corresponding to the output video image.

2. The method of claim 1, further comprising the step of determining the values for neighbouring pixels in the output video image from the pixels between a corresponding support point and a neighbouring support point in the input image such that adjacent output pixels have a maximum difference.

3. The method as claimed in claim 1, further comprising calculating a pixel or subpixel value for a pixel or subpixel in the output video image from pixel or subpixel values in the input video image lying between a corresponding support point and both neighbouring support points.

4. A control circuit for controlling a display device having a microprocessor, a program memory and a main memory, and also input means for scaling ratios, wherein the control circuit is adapted to execute the method of claim 1.

5. A film scanner with a control monitor, further having a control circuit according to claim 4.

* * * * *